United States Patent [19]
Athearn

[11] 4,307,162
[45] Dec. 22, 1981

[54] LITHIUM ALLOY COATING FOR ANODE COLLECTOR IN LITHIUM BATTERIES

[75] Inventor: Lee F. Athearn, Fridley, Minn.

[73] Assignee: Medtronic, Inc., Minneapolis, Minn.

[21] Appl. No.: 190,617

[22] Filed: Sep. 25, 1980

[51] Int. Cl.³ .............................................. H01M 2/26
[52] U.S. Cl. .................................... 429/121; 429/101; 429/122
[58] Field of Search ................ 429/121, 122, 101–103, 429/218

[56] References Cited
U.S. PATENT DOCUMENTS
4,212,930  7/1980  Athearn .............................. 429/101

*Primary Examiner*—Charles F. Lefevour
*Attorney, Agent, or Firm*—Schroeder, Siegfried, Ryan, Vidas, Steffey & Arrett

[57] ABSTRACT

Protective coatings for anode collector in lithium batteries.

6 Claims, 2 Drawing Figures

LITHIUM ALLOY COATING FOR ANODE COLLECTOR IN LITHIUM BATTERIES

DESCRIPTION

1. Background of Prior Art

Lithium batteries include a cathode, typically a charge transfer complex compound of iodine and an organic constituent, and a lithium anode. Other halogen cathodes may be used such as bromine types. The lithium is usually carried by an anode collector structure which is covered by the anode so that the collector does not come into contact with the cathode material. In these batteries, electrode lead wires extend from the interior of the battery through the battery casing to the exterior. The lead wires are ordinarily sealed to the battery casing by an insulating glass seal or the like to hermetically seal the battery. Typically, in these batteries, the lithium anode is surrounded by the cathode material or otherwise in contact with it. The anode collector is sometimes exposed to the cathode material by defects in the lithium anode material. Unfortunately, these defect areas are prime sites for corrosion and electrical shorts between the cathode and the anode collector.

2. Brief Summary of the Invention

It is a purpose of this invention to protect anode collectors from attack by cathode material by providing thereon a protective coating.

DETAILED DESCRIPTION OF THE INVENTION

Figure 1:
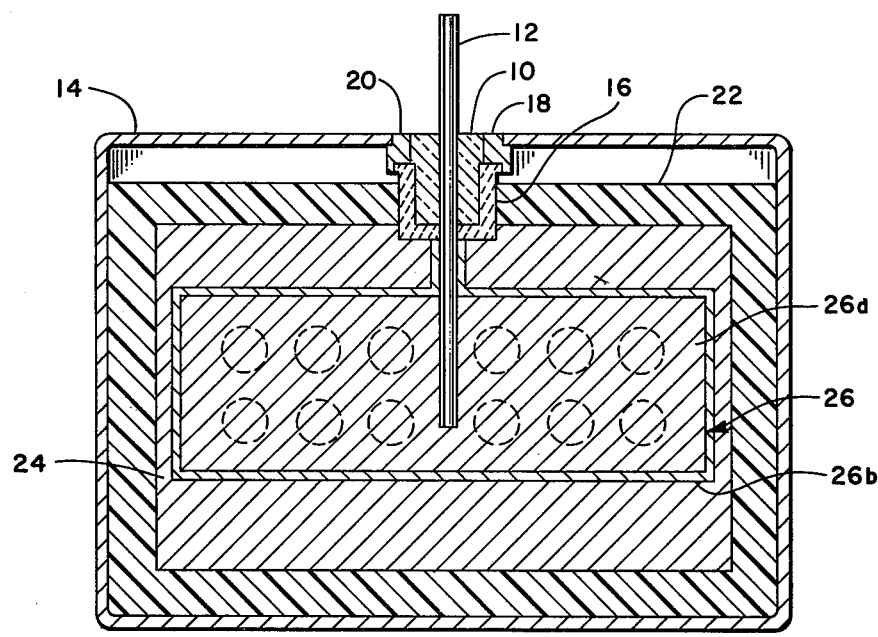
FIGS. 1 and 2 show a lithium battery in cross section, front and end elevations respectively, including a protected anode collector according to the invention.
Figure 2:
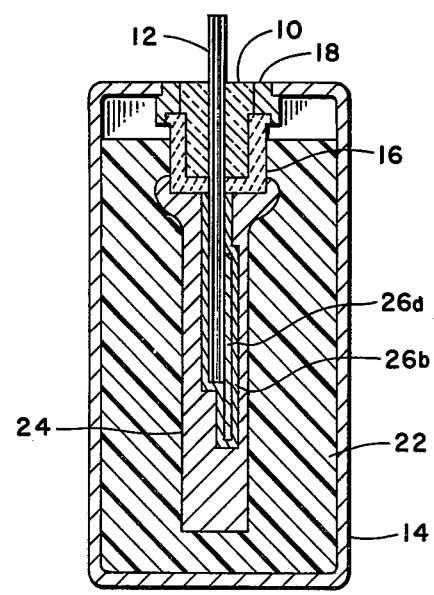

Referring to FIGS. 1 and 2, the advantages of the invention become more readily apparent. FIGS. 1 and 2 are illustrative of battery construction. This particular battery is of the lithium/iodine type and includes a container or casing 14 which is preferably of stainless steel. The casing has an opening generally indicated at 20 into which an electrical feedthrough is hermetically sealed. The peripheral metal portion 18 of the feedthrough is welded to casing 14 as shown and the glass 10 is sealed, as by fusing, to the ferrule. The contents of the cell include a cathode 22 comprised of an organic polymer such as poly-2-vinylpyridine which has been complexed with iodine to form an organic-iodine complex compound. Additional amounts of free iodine may also be included in such a material. The anode 24 of the cell consists of a body of lithium metal incorporating an anode collector 26 which is connected to lead-wire 12 as shown. A ceramic cover 16 interiorly shields glass 10 from the contents of the cell, particularly from the lithium anode 24, since it tends to displace sodium in the glass seal or otherwise chemically attack it. A preferred ceramic for cover means 16 is alumina which has been found to function very satisfactorily with glass and with metal from the standpoint of thermal expansion.

In this particular battery, it is not necessary that the entire inner portion of glass 10 be shielded by ceramic cover 16. For example, cathode materials 22 do not attack the glass. Therefore, those portions of the glass exposed to the cathode need not be shielded with a ceramic cover means. On the other hand, the lithium anode 24 is incompatible with the glass and the ceramic cover means shields at least those portions of the glass which are exposed to the lithium.

Anode collector 26 includes a metal portion 26a such as stainless steel and a coating 26b. Preferably, coating 26b will extend at least partially over anode lead wire 12 as shown.

Coating 26b is a lithium-rich alloy, such as Li/Ca, Li/Cu or Li/Mg. Any lithium alloy may be used which discharges against the cathode material of the battery less readily than the lithium anode does. Thus, if a defect occurs in the lithium of the anode, allowing cathode material to come into contact with the collector, the base material of the collector does not come into contact with the cathode material. Preferably, the lithium alloy coating 26b will include only small amounts, on the order of 2.5 mole percent, of constituents other than lithium. The coating is preferably applied to the collector by hot dipping into a molten bath of the appropriate alloy.

The lithium of the anode may be formed on the coated anode collector and on part of the anode lead, as shown in the Figures, by dipping it in molten lithium. Actually the entire anode structure may be formed in this manner if desired. For example, the anode lead may be connected to the anode collector and the two may be dip coated with the alloy. The resultant assembly may then be dipped in molten lithium one or more times to build up the lithium anode. If the ceramic cover 16 is also attached to the anode lead, the coated anode and collector may be dipped in the molten lithium so as to establish contact between the lithium and the cover. The lithium will fuse thereto.

The lithium may also be pressed to the sides of the coated anode collector to form a sandwich-like structure with the lithium overlapping the collector and being pressed together around the periphery thereof.

Having described the invention, the exclusive rights and privileges thereto are to be defined by the following claims in the light of the foregoing description.

I claim:

1. In a lithium battery anode and current collector combination, the improvement comprising: a collector coating comprised of a lithium alloy which, when coupled with a battery cathode, discharges less readily than the lithium anode when coupled with the same cathode.

2. The combination of claim 1 wherein the lithium alloy is lithium-rich.

3. The combination of claim 1 wherein the alloy comprises lithium and calcium, predominantly lithium.

4. The combination of claim 1 wherein the alloy comprises lithium and copper, predominantly lithium.

5. The combination of claim 1 wherein the alloy comprises lithium and magnesium predominantly lithium.

6. The combination of any of the preceding claims 3, 4 or 5 wherein the minor constituent of the alloy comprises about 2.5 mole percent thereof.

* * * * *